(12) United States Patent
Arima et al.

(10) Patent No.: US 6,968,097 B2
(45) Date of Patent: Nov. 22, 2005

(54) FIBER SHEET AND MANUFACTURING METHOD THEREFOR

(75) Inventors: Tadao Arima, Kawasaki (JP); Osamu Saito, Kawasaki (JP); Shizuo Ishijima, Kawasaki (JP); Hideaki Miyata, Oyama (JP); Hideaki Terauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 10/348,981

(22) Filed: Jan. 23, 2003

(65) Prior Publication Data

US 2004/0033005 A1 Feb. 19, 2004

(30) Foreign Application Priority Data

Aug. 14, 2002 (JP) .............................. 2002-236330

(51) Int. Cl.[7] .................................................. G02B 6/00

(52) U.S. Cl. ....................................... 385/14; 385/137

(58) Field of Search .......................... 385/14, 114, 135, 385/137

(56) References Cited

U.S. PATENT DOCUMENTS

| | | | | |
|---|---|---|---|---|
| 4,138,193 A | * | 2/1979 | Olszewski et al. | 385/114 |
| 4,478,486 A | * | 10/1984 | Fentress et al. | 385/135 |
| 4,911,525 A | * | 3/1990 | Hicks et al. | 385/114 |
| 5,204,925 A | * | 4/1993 | Bonanni et al. | 385/89 |
| 6,442,322 B1 | * | 8/2002 | Chen et al. | 385/137 |
| 6,554,483 B1 | * | 4/2003 | Sun et al. | 385/59 |
| 2003/0007773 A1 | * | 1/2003 | Kondo et al. | 385/137 |
| 2004/0042754 A1 | * | 3/2004 | Arima et al. | 385/135 |

FOREIGN PATENT DOCUMENTS

JP 2001-225419 * 9/2001 ................ 385/14

* cited by examiner

*Primary Examiner*—Rodney Bovernick
*Assistant Examiner*—Mike Stahl
(74) *Attorney, Agent, or Firm*—Staas & Halsey LLP

(57) ABSTRACT

A fiber sheet including a first resin sheet having an adhesive layer on one side, first and second optical fibers wired on the adhesive layer of the first resin sheet so as to cross each other, and a plurality of spacers scattered on the adhesive layer of the first resin sheet. The fiber sheet further includes a second resin sheet attached to the first resin sheet so that the first and second optical fibers and the spacers are sandwiched between the first and second resin sheets. Preferably, each spacer is a spherical spacer.

16 Claims, 6 Drawing Sheets

FIBER SHEET AND MANUFACTURING METHOD THEREFOR

BACKGROUND OF THE INVENTION

1. Field of the Invention

The present invention relates to a fiber sheet having a resin sheet and an optical fiber wired on the resin sheet, and also to a manufacturing method for the fiber sheet.

2. Description of the Related Art

A fiber sheet having a resin sheet and an optical fiber preliminarily wired on the resin sheet so as to correspond to the connecting relation between optical components is used in an optical module, printed circuit board, or optical transmission device. There is a demand for the structure of a fiber sheet and its manufacturing method with no increase in optical loss even in the case of application of an external force. A conventional fiber sheet is formed by preparing a first resin sheet having an adhesive layer on one side, bonding an optical fiber through the adhesive layer to the first resin sheet by applying a pressure to thereby wire the optical fiber on the first resin sheet, and attaching a second resin sheet to the first resin sheet so that the optical fiber is sandwiched therebetween. Such a fiber sheet is frequently used in an optical module or the like, in which a plurality of optical fibers are preliminarily wired so as to correspond to the connecting relation between optical components.

In the conventional fiber sheet, there is a possibility of bending of the optical fibers by an external force applied during the manufacture or use of the fiber sheet at a cross point where the optical fibers cross each other, causing an increase in optical loss. In the case of applying the fiber sheet to an optical module or the like, the fiber sheet is required to support high-density mounting, so that it must have a resistance against an external force. Further, in the conventional fiber sheet, the optical fibers are wired on the first resin sheet in consideration of only the allowable bend radius of each optical fiber in the plane of the resin sheet.

Accordingly, in the case that the fiber sheet is bent with a radius of curvature smaller than the allowable bend radius of each optical fiber, the optical loss increases to cause a reduction in reliability. As a result, it is difficult to mount the fiber sheet in its bent condition, and in the case of using the fiber sheet for wiring between optical components in an optical module, the mounting area of the optical components becomes large. Further, in the case of using the fiber sheet for wiring between adjacent printed circuit boards, the distance between the adjacent printed circuit boards becomes large.

SUMMARY OF THE INVENTION

It is therefore an object of the present invention to provide a fiber sheet which can suppress an increase in optical loss at the cross point where the optical fibers cross each other, in the case where an external force is applied.

It is another object of the present invention to provide a fiber sheet which can be bent with a radius of curvature smaller than the allowable bend radius of an optical fiber.

In accordance with an aspect of the present invention, there is provided a fiber sheet including a first resin sheet having an adhesive layer on one side; a first optical fiber wired on the adhesive layer of the first resin sheet; a plurality of spacers scattered on the adhesive layer of the first resin sheet; and a second resin sheet attached to the first resin sheet so that the first optical fiber and the spacers are sandwiched between the first and second resin sheets.

The fiber sheet further includes a second optical fiber wired on the adhesive layer of the first resin sheet so as to cross the first optical fiber. Preferably, each spacer includes a spherical spacer, which is formed of resin. Preferably, each spherical spacer has a diameter 1.5 to 3.0 times the outer diameter of the first optical fiber.

In accordance with another aspect of the present invention, there is provided a manufacturing method for a fiber sheet, including the steps of providing a first resin sheet having an adhesive layer on one side; wiring a first optical fiber on the adhesive layer of the first resin sheet; putting a plurality of spacers on the adhesive layer of the first resin sheet; moving the spacers away from the first optical fiber by spraying a gas; and attaching a second resin sheet to the first resin sheet so that the first optical fiber and the spacers are sandwiched between the first and second resin sheets.

In accordance with a further aspect of the present invention, there is provided a fiber sheet including a first resin sheet having an adhesive layer on one side; an optical fiber wired on the adhesive layer of the first resin sheet; and a second resin sheet attached to the first resin sheet so that the optical fiber is sandwiched between the first and second resin sheets; wherein the first and second resin sheets are bent, and a part of the optical fiber present at a bent portion of the first and second resin sheets is wired so as to extend in a direction inclined at an angle of 30 to 80 degrees with respect to a bending direction of the first and second resin sheets.

Preferably, the fiber sheet further includes an elastic member sandwiched between the first and second resin sheets so as to extend in the bending direction of the first and second resin sheets. Alternatively, at least one of the first and second resin sheets may be formed of an elastic material. Preferably, the fiber sheet further includes a plurality of spherical spacers sandwiched between the first and second resin sheets. Each spherical spacer has a diameter 1.5 to 3.0 times the outer diameter of the optical fiber.

In accordance with a still further aspect of the present invention, there is provided a fiber sheet including a pair of resin sheets; and an optical fiber sandwiched between the pair of resin sheets for connecting first and second optical components; the optical fiber including a first optical connection terminal projecting from the fiber sheet for connection with the first optical component; a second optical connection terminal projecting from the fiber sheet for connection with the second optical component; and an optical transmission line embedded in the fiber sheet for connecting the first and second optical connection terminals, the optical transmission line having a substantially S-shaped portion.

In accordance with a still further aspect of the present invention, there is provided an H-shaped fiber sheet including a pair of resin sheets; a plurality of optical fibers sandwiched between the pair of resin sheets; a first cutout portion having opposite sides; a second cutout portion having opposite sides; and a central path portion formed between the first and second cutout portions; the plurality of optical fibers including first optical connection terminals projecting from the opposite sides of the first cutout portion; second optical connection terminals projecting from the opposite sides of the second cutout portion; and optical transmission lines passed through the central path portion for connecting the first optical connection terminals and the second optical connection terminals.

Preferably, the resin sheets are bent at the central path portion so that the first and second cutout portions are opposed to each other; the first optical connection terminals are connected to first optical components placed inside the first cutout portion; and the second optical connection terminals are connected to second optical components placed inside the second cutout portion.

In accordance with a still further aspect of the present invention, there is provided an H-shaped fiber sheet including a pair of resin sheets; a plurality of optical fibers sandwiched between the pair of resin sheets; a first cutout portion having opposite sides; a second cutout portion having opposite sides; and a central path portion formed between the first and second cutout portions; the plurality of optical fibers including first optical connection terminals projecting from the opposite sides of the first cutout portion; second optical connection terminals projecting from the opposite sides of the second cutout portion; a first optical transmission line passed through the central path portion for connecting at least one of the first optical connection terminals and at least one of the second optical connection terminals; and a second optical transmission line passed through the central path portion for connecting at least one pair of the first optical connection terminals or of the second optical connection terminals.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
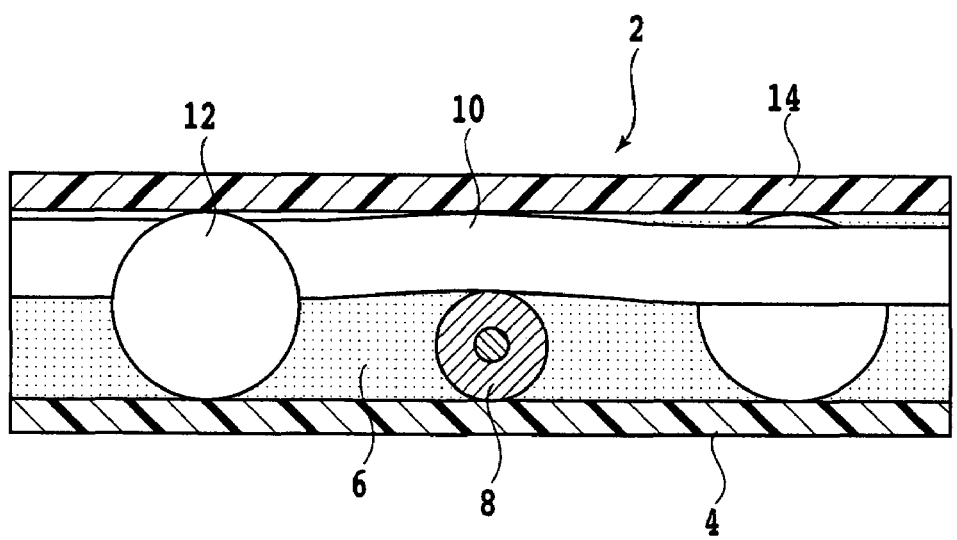
FIG. 1 is a sectional view of a fiber sheet according to a first preferred embodiment of the present invention.

Referring to FIG. 1, there is shown a sectional view of a fiber sheet 2 according to a first preferred embodiment of the present invention. The fiber sheet 2 includes a first resin sheet 4 formed from a polyimide film, for example. An adhesive layer 6 is formed on one side surface of the first resin sheet 4 by applying a pressure-sensitive adhesive such as rubber elastomer or rosin. Reference numerals 8 and 10 denote optical fibers each having an outer diameter of 250 $\mu$m as a coating diameter. The optical fibers 8 and 10 are preliminarily wired on the adhesive layer 6 of the first resin sheet 4 so as to correspond to the connecting relation between optical components. The optical fibers 8 and 10 are wired so as to cross each other.

Reference numerals 12 denote numerous spherical spacers formed of resin such as styrene resin or acrylic resin. The spherical spacers 12 are scattered on the adhesive layer 6 of the first resin sheet 4. The diameter of each spherical spacer 12 is preferably 1.5 to 3.0 times, more preferably 1.8 to 2.5 times, the outer diameter of each of the optical fibers 8 and 10. For example, a spherical spacer having a diameter of about 0.5 mm is used as each spherical spacer 12. A second resin sheet 14 is attached to the first resin sheet 4 so that the optical fibers 8 and 10 and the spherical spacers 12 are sandwiched between the first and second resin sheets 4 and 14. The second resin sheet 14 is also formed from a polyimide film, for example.

A manufacturing method for the fiber sheet 2 according to this preferred embodiment will now be described. First, an elastic adhesive is applied to one side surface of the first resin sheet 4 to form the adhesive layer 6. Second, the optical fibers 8 and 10 are wired on the adhesive layer 6 of the first resin sheet 4. The wiring of the optical fibers 8 and 10 is performed by automatically positioning the optical fibers 8 and 10 by means of an automatic wiring machine in accordance with preliminarily input data and next applying a pressure to the optical fibers 8 and 10 against the adhesive layer 6, thereby bonding the optical fibers 8 and 10 through the adhesive layer 6 to the first resin sheet 4.

Thereafter, the spherical spacers 12 are scattered on the adhesive layer 6 of the first resin sheet 4. The scattering of the spherical spacers 12 is performed in the following manner. First, the numerous spherical spacers 12 each having a diameter of about 0.5 mm are put into a box having a bottom plate with numerous holes each having a diameter slightly larger than the diameter of each spherical spacer 12, and the box is next shaken to thereby drop the spherical spacers 12 through the holes onto the adhesive layer 6 of the first resin sheet 4. The holes of the bottom plate of the box are formed at intervals of 5 mm. Further, a gas such as air is sprayed to the spherical spacers 12 present on the optical fibers 8 and 10 by using a blower or the like to thereby move the spherical spacers 12 away from the optical fibers 8 and 10 to the adhesive layer 6. Thus, the spherical spacers 12 are uniformly scattered on the adhesive layer 6. Thereafter, the second resin sheet 14 is attached through the adhesive layer 6 to the first resin sheet 4. Thus, the fiber sheet 2 is obtained in the condition that the spherical spacers 12 are spaced about 5 mm apart from each other and bonded to the adhesive layer 6. Further, the scattering density of the spherical spacers 12 on the adhesive layer 6 can be uniformed by spraying the gas as mentioned above.

Figure 2:
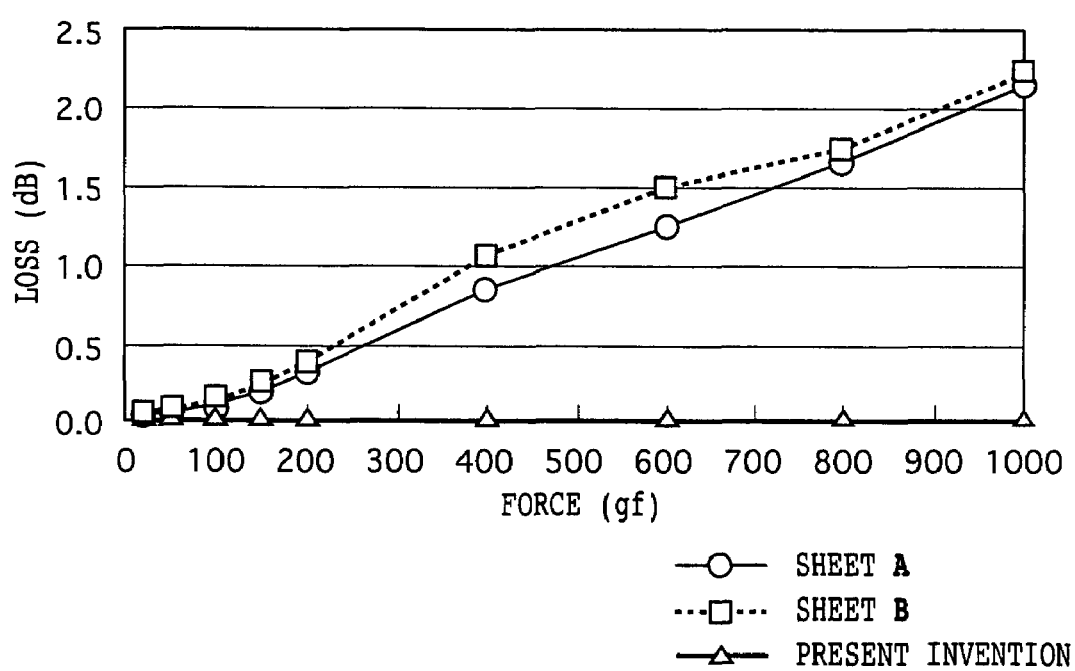
FIG. 2 is a graph showing changes in optical loss with external forces applied to the fiber sheet according to the present invention in comparison with conventional fiber sheets.

FIG. 2 shows the results of measurement of changes in optical loss with external forces applied to conventional fiber sheets (sheet A and sheet B) and to the fiber sheet 2 according to the first preferred embodiment of the present invention. As apparent from FIG. 2, the loss in the optical fibers 8 and 10 of the fiber sheet 2 according to the first preferred embodiment of the present invention can be suppressed to nearly zero even when a considerably large external force is applied. In the fiber sheet 2 according to this preferred embodiment, the external force applied is received mainly by the spherical spacers 12. Accordingly, the effect of suppression of the loss in the optical fibers 8 and 10 is remarkable particularly at the cross point where the optical fibers 8 and 10 cross each other. However, also at any points other than the cross point, the optical fibers 8 and 10 can be effectively protected from the influence of the external force.

Figure 3:
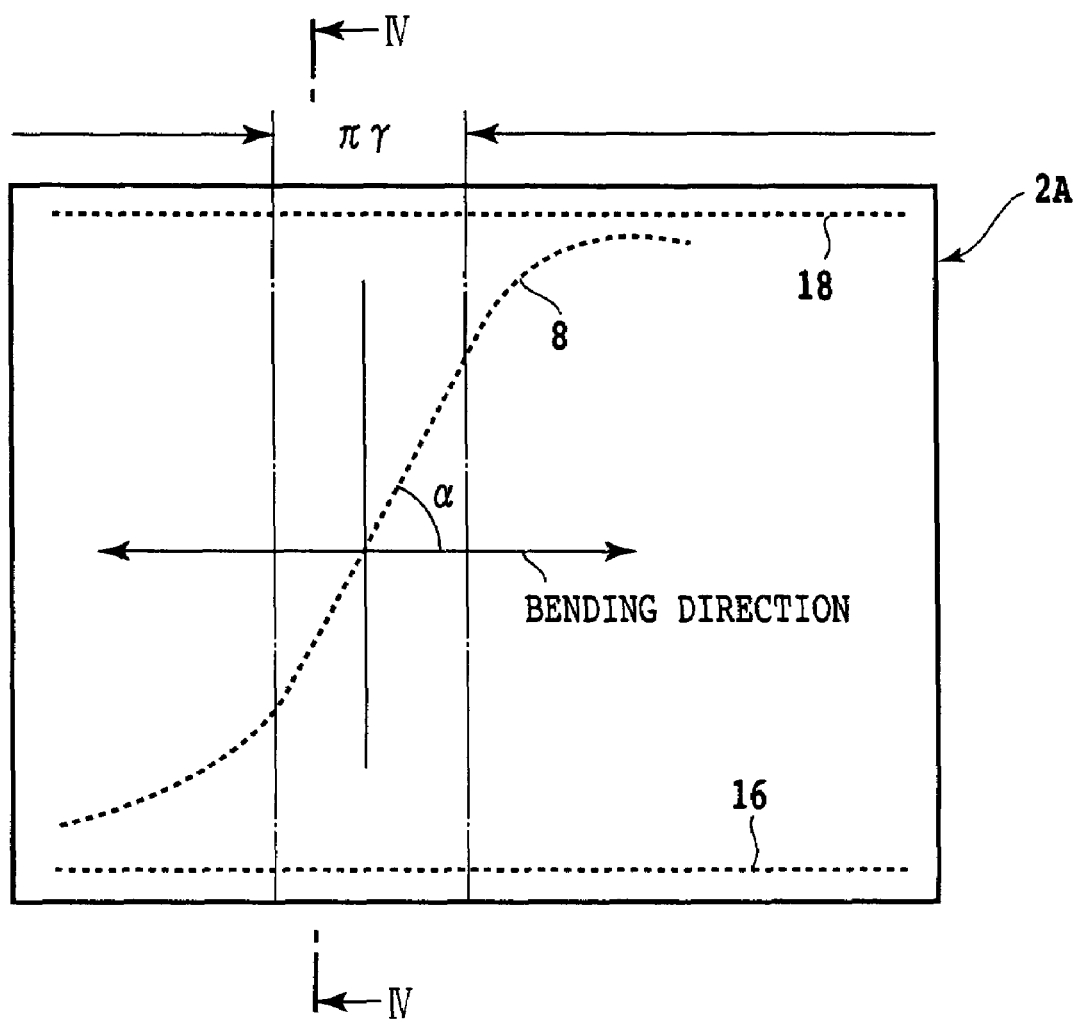
FIG. 3 is a plan view of a fiber sheet according to a second preferred embodiment of the present invention.
Figure 4:
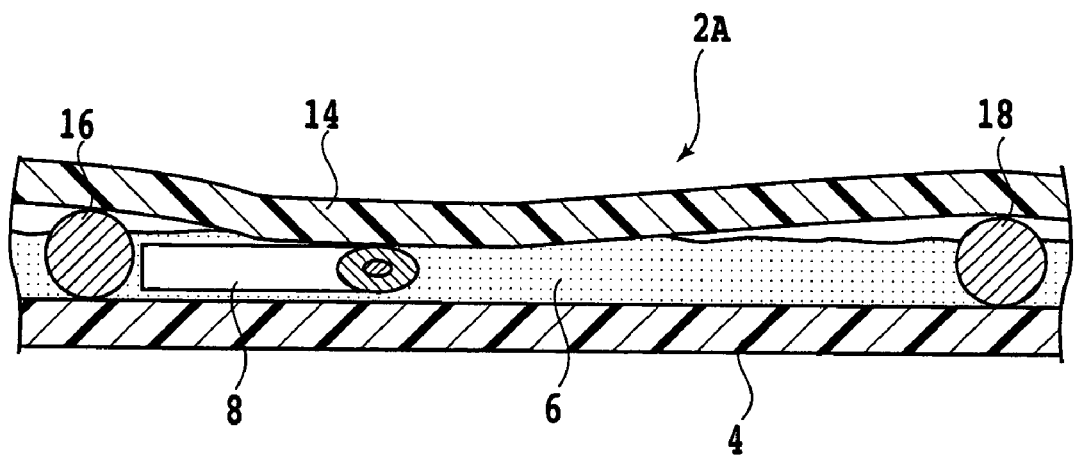
FIG. 4 is a cross section taken along the line IV—IV in FIG. 3.
Figure 5:
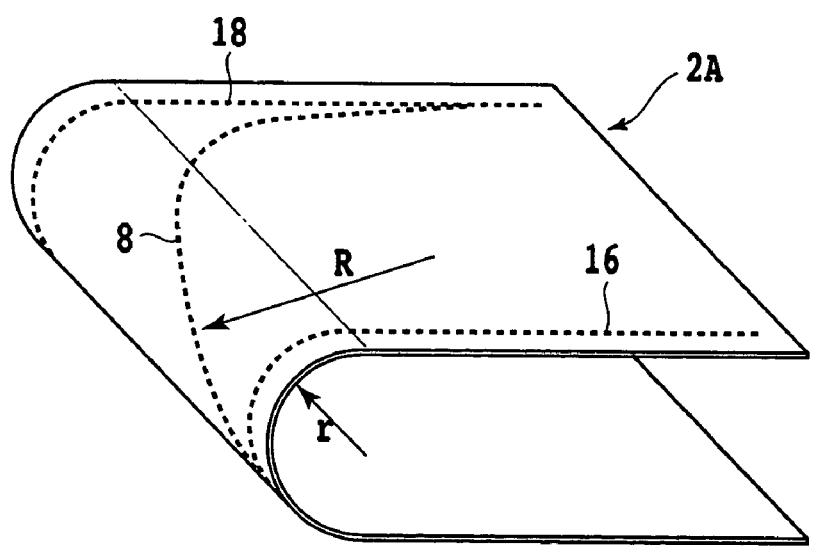
FIG. 5 is a perspective view of the fiber sheet shown in FIG. 3 in its bent condition.

Referring to FIG. 3, there is shown a plan view of a fiber sheet 2A according to a second preferred embodiment of the present invention. FIG. 4 is a cross section taken along the line IV—IV in FIG. 3. FIG. 5 is a perspective view of the fiber sheet 2A in its bent condition. The fiber sheet 2A according to this preferred embodiment is a flexible or bendable fiber sheet, and it is used for assembly of an optical amplifier for wavelength division multiplexing (WDM) in this preferred embodiment. Substantially the same parts as those in the first preferred embodiment are denoted by the same reference numerals in the second preferred embodiment.

In general, the number of optical components in an optical amplifier for WDM is large, so that the work of forming and connecting optical fibers in the optical amplifier is troublesome to cause an increase in man-hour for the manufacture. The use of a fiber sheet is greatly effective in reducing the man-hour for assembly of an optical amplifier for WDM. However, in the case of using a general fiber sheet in the prior art, the optical components must be arranged in one plane, causing an increase in mounting area for the optical components. To cope with this, the bendable fiber sheet 2A according to this preferred embodiment is applied to the assembly of an optical amplifier for WDM.

As shown in FIGS. 3 to 5, the fiber sheet 2A includes a first resin sheet 4 having an adhesive layer 6, an optical fiber 8 wired on the adhesive layer 6 so that a part of the optical fiber 8 present at a bent portion of the first resin sheet 4 extends in a direction inclined at a given angle $\alpha$ with respect to a direction of bend of the first resin sheet 4 (the longitudinal direction of the first resin sheet 4), and a second resin sheet 14 attached through the adhesive layer 6 to the first resin sheet 4 so that the optical fiber 8 is sandwiched between the first and second resin sheets 4 and 14. The fiber sheet 2A further includes a pair of elastic members 16 and 18 sandwiched between the first and second resin sheets 4 and 14 in the vicinity of the opposite side edges of the fiber sheet 2A so as to extend in the bending direction of the fiber sheet 2A. Each of the elastic members 16 and 18 is formed from a nylon yarn having a diameter of 0.5 mm.

There will now be described a wiring design for the optical fiber 8. The wiring of the optical fiber 8 at the bent portion of the fiber sheet 2A is designed so as to satisfy the following conditions. The larger the wiring angle $\alpha$ of a part of the optical fiber 8 present at the bent portion of the fiber sheet 2A as viewed in the flat condition shown in FIG. 3, the larger the radius of curvature R of the optical fiber 8 at the bent portion of the fiber sheet 2A shown in FIG. 5.

When the fiber sheet 2A is bent with a radius of curvature r as shown in FIG. 5, the radius of curvature R of the optical fiber 8 at the bent portion of the fiber sheet 2A is given by the following expression.

$$\cos^2\alpha = r/(2R-r) \tag{1}$$

The wiring angle $\alpha$ of the optical fiber 8 is set to a given angle or more to thereby make the radius of curvature R of the optical fiber 8 at the bent portion equal to or greater than a given value even when the fiber sheet 2A is bent with the radius of curvature r, thereby allowing suppression of an increase in optical loss in the optical fiber 8 and a reduction in reliability of the optical fiber 8.

Figure 6:
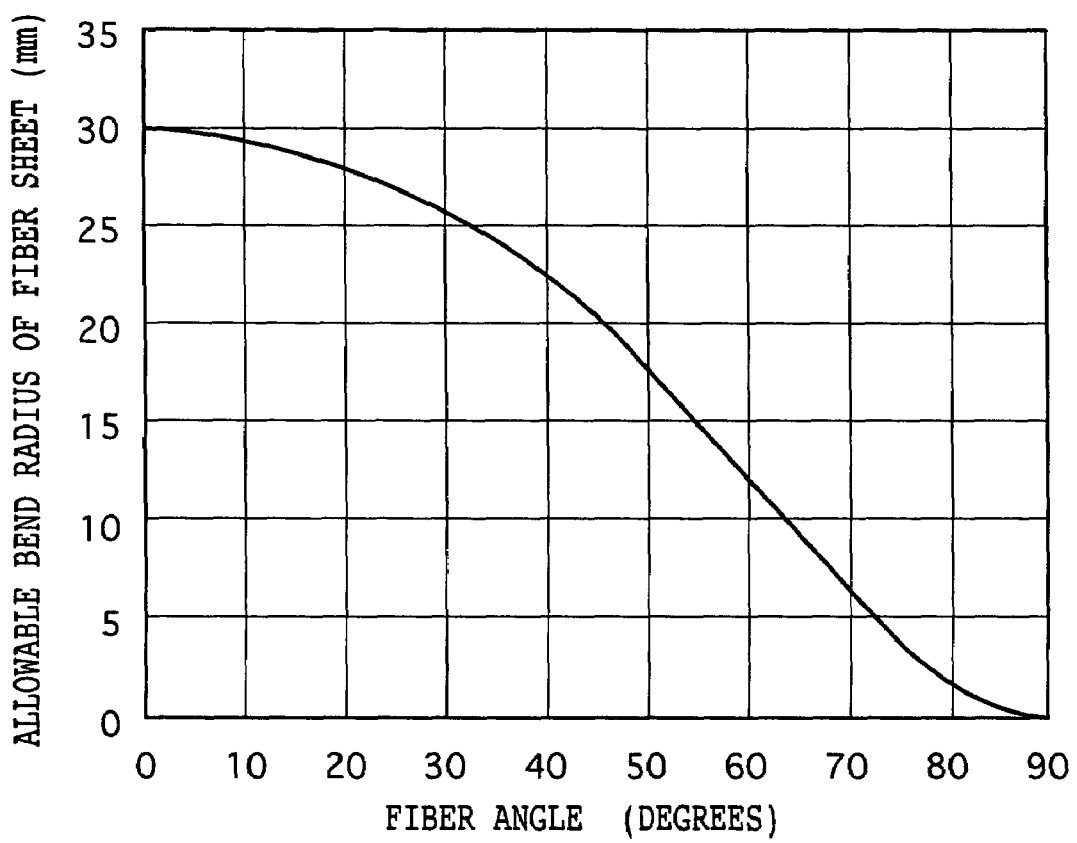
FIG. 6 is a graph showing the relation between a fiber angle and an allowable bend radius of the fiber sheet shown in FIG. 5.

FIG. 6 shows the relation between the wiring angle $\alpha$ of the optical fiber 8 and the allowable radius of curvature r of the fiber sheet 2A by calculation in the case that the allowable radius of curvature R of the optical fiber 8 is 30 mm. Particularly by setting the angle $\alpha$ to 30 degrees or more, the allowable radius of curvature r of the fiber sheet 2A can be reduced to 1/1.2 or less of that in the case of $\alpha=0$ degree, thus obtaining an effect in practical use. If $\alpha$ is less than 30 degrees, the allowable range of the radius of curvature r of the fiber sheet 2A becomes narrow with larger values. If $\alpha$ is greater than 80 degrees, the width of the fiber sheet 2A becomes large to cause a difficulty of the wiring design. Therefore, the wiring angle $\alpha$ of the optical fiber 8 at the bent portion of the fiber sheet 2A is preferably set in the range of 30 to 80 degrees.

As an example, the fiber sheet 2A having the optical fiber 8 with the allowable bend radius R=30 mm is bent with the radius of curvature r=5 mm by setting the wiring angle $\alpha$ to 73 degrees in accordance with the result of calculation shown in FIG. 6. Thus, even when the fiber sheet 2A is bent with the radius of curvature r= 5 mm, the optical fiber 8 can meet the condition of the allowable bend radius R=30 mm at the bent portion of the fiber sheet 2A.

A fabrication method for the fiber sheet 2A will now be described. The optical fiber 8 is wired on the adhesive layer 6 of the first resin sheet 4 at its bent portion to be bent in actual use so that the angle $\alpha$ becomes 73 degrees. The wiring of the optical fiber 8 at this bent portion of the first resin sheet 4 is performed by determining the X and Y coordinates of two points on the optical fiber 8 with an automatic wiring machine and applying a pressure to the optical fiber 8 against the adhesive layer 6 of the first resin sheet 4, thereby bonding the optical fiber 8 through the adhesive layer 6 to the first resin sheet 4. The remaining part of the optical fiber 8 is wired on the adhesive layer 6 so that the bend radius R of the optical fiber 8 becomes equal to or more than 30 mm. Finally, the second resin sheet 14 is attached through the adhesive layer 6 to the first resin sheet 4 with the optical fiber 8 sandwiched between the first and second resin sheets 4 and 14.

As means for preventing the break of the optical fiber 8 by an abrupt bend, the elastic members 16 and 18 formed of resin such as nylon are sandwiched between the first and second resin sheets 4 and 14 so as to extend in the bending direction of the fiber sheet 2A in the vicinity of the opposite side edges thereof. Alternatively, at least one of the first and second resin sheets 4 and 14 may be formed of an elastic material without the use of the elastic members 16 and 18. As an example of this elastic material, a thermoplastic polyester elastomer commercially available as the trade name of Hytrel R (manufactured by DuPont) may be used.

Figure 7:
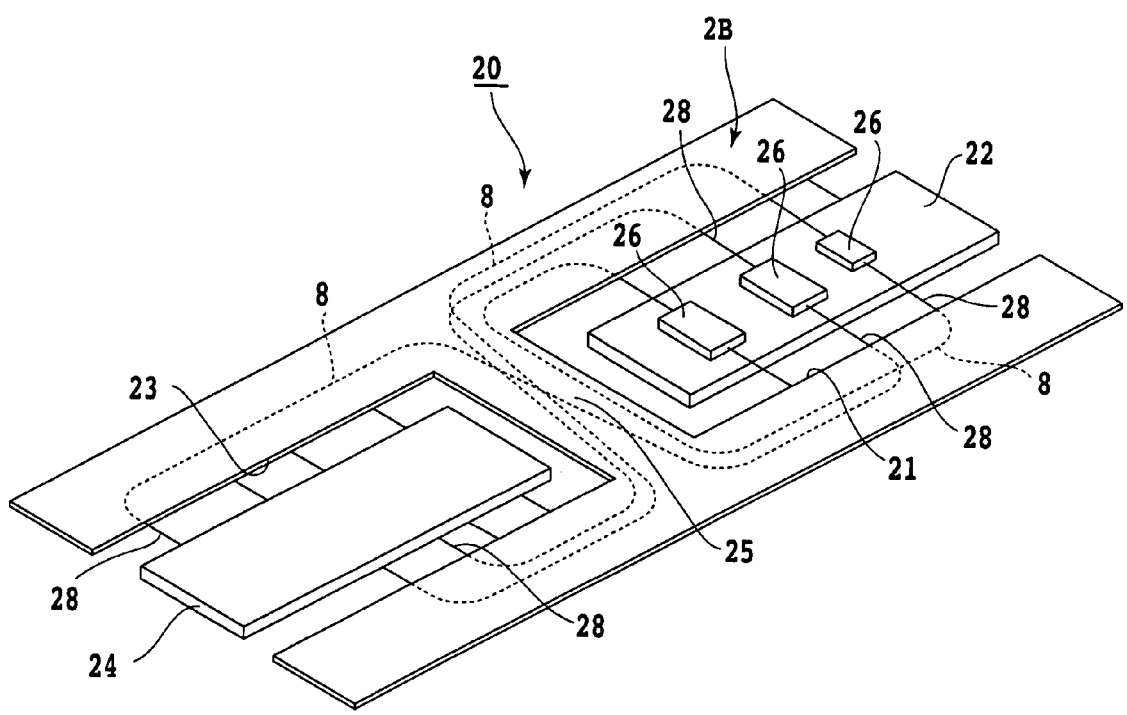
FIG. 7 is a perspective view of an optical module using a fiber sheet according to a third preferred embodiment of the present invention.
Figure 8:
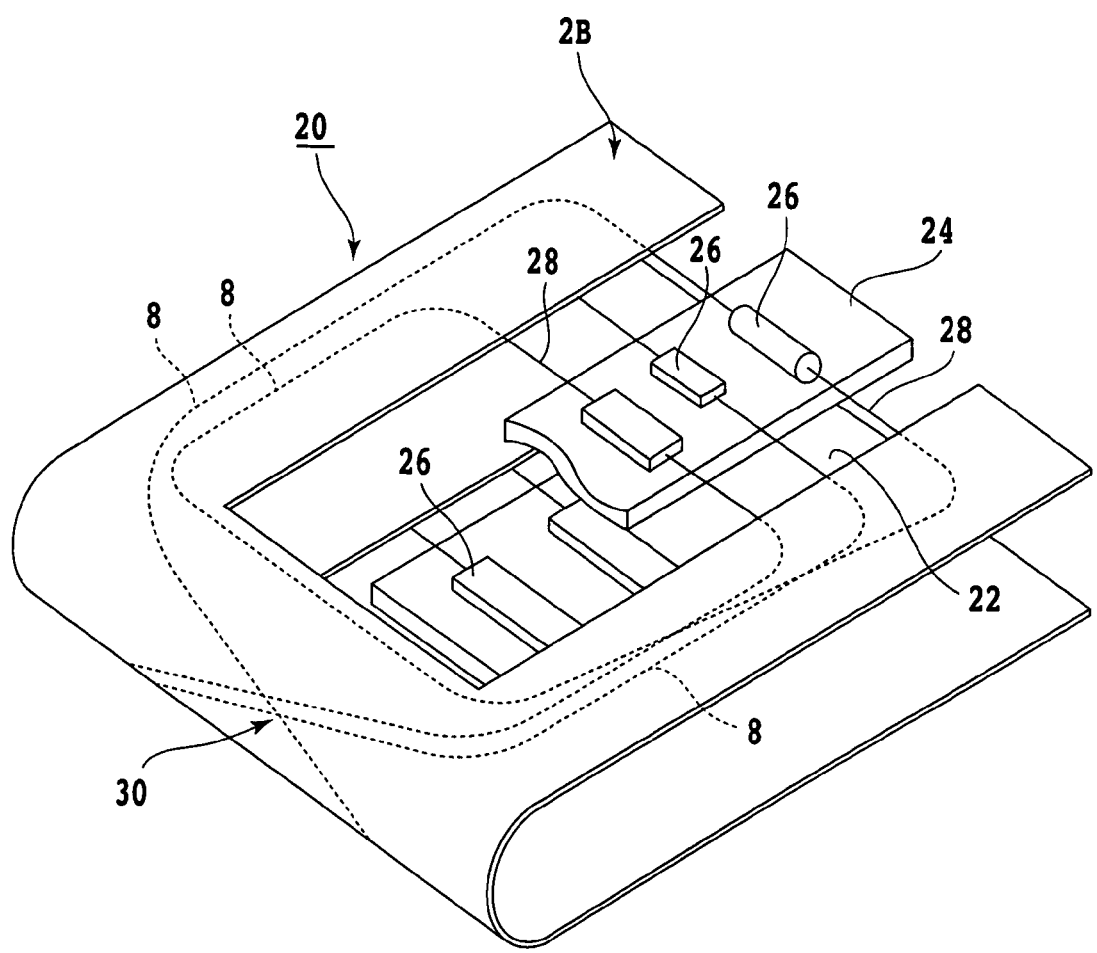
FIG. 8 is a partially cutaway, perspective view of the optical module shown in FIG. 7 in the condition where the fiber sheet is bent.

FIG. 7 is a perspective view of an optical module 20 using a fiber sheet 2B according to a third preferred embodiment of the present invention, and FIG. 8 is a partially cutaway, perspective view of the optical module 20 in its bent condition. As shown in FIG. 7, the fiber sheet 2B has two cutouts 21 and 23 so as to form a substantially H-shaped configuration as a whole. Two substrates 22 and 24 are placed in the two cutouts 21 and 23, respectively. A plurality of optical components 26 are mounted on the upper surface of the substrate 22, and a plurality of optical components 26 (not shown in FIG. 7, but shown in FIG. 8) are similarly mounted on the lower surface of the substrate 24. As shown by broken lines, the fiber sheet 2B has a plurality of optical fibers 8 sandwiched between a pair of upper and lower resin sheets not especially shown. The optical fibers 8 project into the cutouts 21 and 23 and are fusion-spliced to optical fibers 28 connected to the optical components 26 inside the cutouts 21 and 23.

In this specification, the optical fibers 8 projecting from the fiber sheet 2B into the cutout 21 are referred to also as first optical connection terminals, and the optical fibers 8 projecting from the fiber sheet 2B into the cutout 23 are referred to also as second optical connection terminals. The fiber sheet 2B further has a central path portion 25 between the cutouts 21 and 23 through which the optical fibers 8 are passed. Some of the optical fibers 8 present at the central path portion 25 are so wired as to form a substantially S-shaped configuration.

Referring to FIG. 8, reference numeral 30 denotes a bent portion of the fiber sheet 2B. At the bent portion 30, each of the substantially S-shaped optical fibers 8 extends in a direction inclined at an angle of 30 to 80 degrees with respect to the bending direction of the fiber sheet 2B. Although not shown in FIGS. 7 and 8, numerous spherical spacers similar to the spherical spacers 12 shown in FIG. 1 are sandwiched between the upper and lower resin sheets of the fiber sheet 2B, thereby suppressing an increase in optical loss in the optical fibers 8 at each cross point.

According to this preferred embodiment, the optical fibers 28 connected to the optical components 26 mounted on the substrates 22 and 24 are fusion-spliced to the optical fibers 8 of the fiber sheet 2B in its flat condition shown in FIG. 7, and the fiber sheet 2B is next bent as shown in FIG. 8 to thereby reduce the mounting area for the optical components 26 to 0.55 times that of a conventional optical module using a fiber sheet. The volume of the optical module 20 can also be reduced to 0.8 times that of the conventional optical module. Even when the fiber sheet 2B is bent with a radius of curvature of about 5 mm, the increase in loss in the optical fibers 8 is suppressed to 0.02 dB or less, and almost no deterioration in the optical fibers 8 is observed.

According to the present invention as described above, the fiber sheet includes numerous spacers sandwiched between the first and second resin sheets, so that bending of the optical fibers can be prevented especially at the cross point where the optical fibers cross each other, thereby suppressing an increase in optical loss in the optical fibers. Further, there is no limit to a wiring route for the optical fibers as in the case of preliminarily providing projections.

According to another aspect of the present invention, the optical fibers present at a bent portion of the fiber sheet are wired so that each optical fiber extends in a direction inclined at an angle of 30 to 80 degrees with respect to the bending direction of the fiber sheet. Accordingly, the fiber sheet can be bent with a radius of curvature smaller than the allowable bend radius of each optical fiber, thereby allowing a reduction in size of an optical module using this fiber sheet and the connection between adjacent substrates in the optical module.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A fiber sheet further comprising:
    a first resin sheet having an adhesive layer on one side;
    a first optical fiber wired on said adhesive layer of said first resin sheet;
    a plurality of spacers scattered on said adhesive layer of said first resin sheet, each of said spacers having a height greater than a diameter of an optical fiber wired thereon;
    a second resin sheet attached to said first resin sheet so that said first optical fiber and said spacers are sandwiched between said first and second resin sheets; and
    a second optical fiber wired on said adhesive layer of said first resin sheet so as to cross said first optical fiber.

2. A fiber sheet comprising:
    a first resin sheet having an adhesive layer on one side;
    an optical fiber wired on said adhesive layer of said first resin sheet;
    a plurality of spacers scattered on said adhesive layer of said first resin sheet; and
    a second resin sheet attached to said first resin sheet so that said optical fiber and said spacers are sandwiched between said first and second resin sheets,
    wherein said spacers comprise spherical spacers.

3. A fiber sheet according to claim 2, wherein each of said spherical spacers is formed of resin.

4. A fiber sheet according to claim 2, wherein each of said spherical spacers has a diameter 1.5 to 3.0 times the outer diameter of said optical fiber.

5. A manufacturing method for a fiber sheet, comprising the steps of:
    providing a first resin sheet having an adhesive layer on one side;
    wiring a first optical fiber on said adhesive layer of said first resin sheet;
    putting a plurality of spacers on said adhesive layer of said first resin sheet;
    moving said spacers away from said first optical fiber by spraying a gas; and
    attaching a second resin sheet to said first resin sheet so that said first optical fiber and said spacers are sandwiched between said first and second resin sheets.

6. A manufacturing method according to claim 5, further comprising the step of wiring a second optical fiber on said adhesive layer of said first resin sheet so that said second optical fiber crosses said first optical fiber before said step of putting said spacers.

7. A fiber sheet comprising:
    a first resin sheet having an adhesive layer on one side;
    an optical fiber wired on said adhesive layer of said first resin sheet; and
    a second resin sheet attached to said first resin sheet so that said optical fiber is sandwiched between said first and second resin sheets;
    wherein said first and second resin sheets are bent to form a U-shape, and a part of said optical fiber present at a bent portion of said first and second resin sheets is wired so as to extend in a direction inclined at an angle of 30 to 80 degrees with respect to a bending direction of said first and second resin sheets.

8. A fiber sheet according to claim 7, further comprising an elastic member sandwiched between said first and second resin sheets so as to extend in the bending direction of said first and second resin sheets.

9. A fiber sheet according to claim 8, wherein at least one of said first and second resin sheets is formed of an elastic material.

10. A fiber sheet comprising:
    a first resin sheet having an adhesive layer on one side;
    an optical fiber wired on said adhesive layer of said first resin sheet;
    a second resin sheet attached to said first resin sheet so that said optical fiber is sandwiched between said first and second resin sheets; and
    a plurality of spherical spacers sandwiched between said first and second resin sheets, wherein said first and second resin sheets are bent, and a part of said optical fiber present at a bent portion of said first and second resin sheets is wired so as to extend in a direction inclined at an angle of 30 to 80 degrees with respect to a bending direction of said first and second resin sheets.

11. A fiber sheet according to claim 10, wherein each of said spherical spacers has a diameter 1.5 to 3.0 times the outer diameter of said optical fiber.

12. A fiber sheet comprising:
a pair of resin sheets; and
an optical fiber sandwiched between said pair of resin sheets for connecting first and second optical components;
said optical fiber comprising:
 a first optical connection terminal projecting from said fiber sheet for connection with said first optical component;
 a second optical connection terminal projecting from said fiber sheet for connection with said second optical component; and
 an optical transmission line embedded in said fiber sheet for connecting said first and second optical connection terminals, said optical transmission line having a substantially S-shaped portion, wherein at least a part of said S-shaped portion of said optical transmission line is bent together with said pair of resin sheets.

13. An H-shaped fiber sheet comprising:
a pair of resin sheets;
a plurality of optical fibers sandwiched between said pair of resin sheets;
a first cutout portion having opposite sides;
a second cutout portion having opposite sides; and
a central path portion formed between said first and second cutout portions;
said plurality of optical fibers comprising:
 first optical connection terminals projecting from said opposite sides of said first cutout portion;
 second optical connection terminals projecting from said opposite sides of said second cutout portion; and
 optical transmission lines passed through said central path portion for connecting said first optical connection terminals and said second optical connection terminals.

14. An H-shaped fiber sheet according to claim 13, wherein:
said resin sheets are bent at said central path portion so that said first and second cutout portions are opposed to each other;
said first optical connection terminals are connected to first optical components placed inside said first cutout portion; and
said second optical connection terminals are connected to second optical components placed inside said second cutout portion.

15. An H-shaped fiber sheet comprising:
a pair of resin sheets;
a plurality of optical fibers sandwiched between said pair of resin sheets;
a first cutout portion having opposite sides;
a second cutout portion having opposite sides; and
a central path portion formed between said first and second cutout portions;
said plurality of optical fibers comprising:
 first optical connection terminals projecting from said opposite sides of said first cutout portion;
 second optical connection terminals projecting from said opposite sides of said second cutout portion;
 a first optical transmission line passed through said central path portion for connecting at least one of said first optical connection terminals and at least one of said second optical connection terminals; and
 a second optical transmission line passed through said central path portion for connecting at least one pair of said first optical connection terminals or of said second optical connection terminals.

16. A fiber sheet, comprising:
a first resin sheet having an adhesive layer on one side;
a first optical fiber wired on said adhesive layer of said first resin sheet;
a plurality of granular in shape spacers scattered on said adhesive layer of said first resin sheet, each of said spacers having a height greater than a diameter of an optical fiber wired thereon; and
a second resin sheet attached to said first resin sheet so that said first optical fiber and said spacers are sandwiched between said first and second resin sheets.

* * * * *

UNITED STATES PATENT AND TRADEMARK OFFICE
CERTIFICATE OF CORRECTION

PATENT NO. : 6,968,097 B2 Page 1 of 1
APPLICATION NO. : 10/348981
DATED : November 22, 2005
INVENTOR(S) : Tadao Arima et al.

It is certified that error appears in the above-identified patent and that said Letters Patent is hereby corrected as shown below:

On the title page: Column 2 Item [56]: (Foreign Patent Documents), replace "2001-225419" with --2001-255419--, therefor;

Column 7, line 55, claim 1, after "sheet" delete "further";

Column 8, line 55, claim 9, replace "claim 8" with --claim 7--, therefor.

Signed and Sealed this

Twenty-ninth Day of August, 2006

JON W. DUDAS
*Director of the United States Patent and Trademark Office*